(12) United States Patent
Sauder et al.

(10) Patent No.: US 10,455,756 B2
(45) Date of Patent: Oct. 29, 2019

(54) AGRICULTURAL TRENCH DEPTH SENSING SYSTEMS, METHODS, AND APPARATUS

(71) Applicant: PRECISION PLANTING LLC, Tremont, IL (US)

(72) Inventors: Derek Sauder, Tremont, IL (US); Jason Stoller, Morton, IL (US); Ian Radtke, Washington, IL (US); Kent Levy, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 15/694,432

(22) Filed: Sep. 1, 2017

(65) Prior Publication Data
US 2017/0359944 A1 Dec. 21, 2017

Related U.S. Application Data

(62) Division of application No. 14/437,985, filed as application No. PCT/US2013/066639 on Oct. 24, 2013, now Pat. No. 9,750,174.
(Continued)

(51) Int. Cl.
*A01B 79/00* (2006.01)
*A01C 7/20* (2006.01)
(Continued)

(52) U.S. Cl.
CPC ............ *A01B 79/005* (2013.01); *A01B 71/02* (2013.01); *A01C 7/203* (2013.01); *G01B 21/18* (2013.01)

(58) Field of Classification Search
CPC ....... A01B 79/005; A01B 71/02; A01C 7/203; G01B 21/18
See application file for complete search history.

(56) References Cited

U.S. PATENT DOCUMENTS

| 4,413,685 A | 11/1983 | Gremelspacher et al. |
| 4,775,940 A | 10/1988 | Nishida et al. |

(Continued)

FOREIGN PATENT DOCUMENTS

| CN | 101080968 A | 12/2007 |
| CN | 201072894 Y | 6/2008 |

(Continued)

OTHER PUBLICATIONS

Australia Office Action, Application No. 2013334552, dated Oct. 11, 2016, 3 pages.
(Continued)

*Primary Examiner* — Behrang Badii
*Assistant Examiner* — Daniel L Greene
(74) *Attorney, Agent, or Firm* — Thomas J. Oppold; Larkin Hoffman Daly & Lindgren, Ltd.

(57) ABSTRACT

Systems, methods and apparatus are provided for determining the depth of a trench opened by an agricultural planter. Sensors are provided for detecting the position of a ground-engaging element of the planter such as a gauge wheel or seed firmer of a row unit of the planter. Apparatus and methods are provided for installing such sensors onto a row unit of the planter. Systems, methods and apparatus are provided for controlling downpressure on a row unit based on the trench depth. Methods are provided for mapping trench depth measured by the depth sensors.

10 Claims, 14 Drawing Sheets

Related U.S. Application Data

(60) Provisional application No. 61/718,073, filed on Oct. 24, 2012.

(51) Int. Cl.
*A01B 71/02* (2006.01)
*G01B 21/18* (2006.01)

(56) References Cited

U.S. PATENT DOCUMENTS

| | | | |
|---|---|---|---|
| 5,553,407 A * | 9/1996 | Stump | E02F 5/06 37/348 |
| 5,875,108 A | 2/1999 | Hoffberg et al. | |
| 6,070,539 A | 6/2000 | Flamme et al. | |
| 6,302,220 B1 | 10/2001 | Mayerle et al. | |
| 6,389,999 B1 | 5/2002 | Duello | |
| 6,688,245 B2 | 2/2004 | Juptner | |
| 7,360,494 B2 | 4/2008 | Martin | |
| 7,360,495 B1 | 4/2008 | Martin | |
| 7,946,232 B2 * | 5/2011 | Patwardhan | A01C 7/203 111/135 |
| 8,909,436 B2 * | 12/2014 | Achen | A01C 5/062 111/134 |
| 2003/0041485 A1 * | 3/2003 | Whitten | E02F 3/08 37/352 |
| 2004/0244660 A1 | 12/2004 | Gabriel | |
| 2005/0046599 A1 * | 3/2005 | Sahm | E02F 9/26 340/995.1 |
| 2008/0125942 A1 * | 5/2008 | Tucker | A01B 69/008 701/50 |
| 2008/0133094 A1 * | 6/2008 | Stanek | E02F 9/26 701/50 |
| 2008/0162004 A1 * | 7/2008 | Price | E02F 3/434 701/50 |
| 2009/0090284 A1 * | 4/2009 | Peterson, Jr. | A01C 7/046 111/185 |
| 2009/0182528 A1 * | 7/2009 | De Groot | G01B 11/06 702/167 |
| 2009/0241817 A1 * | 10/2009 | Eastin | A01C 1/06 111/118 |
| 2011/0311342 A1 * | 12/2011 | Montgomery | G01C 21/04 414/685 |
| 2012/0004768 A1 * | 1/2012 | Schweitzer | A01C 7/105 700/231 |
| 2012/0042813 A1 * | 2/2012 | Liu | A01C 7/105 111/149 |
| 2012/0186503 A1 | 7/2012 | Sauder et al. | |
| 2013/0066639 A1 | 3/2013 | Lee et al. | |
| 2013/0124055 A1 * | 5/2013 | Baurer | H04L 5/001 701/50 |
| 2013/0325160 A1 * | 12/2013 | Gustavsson | E02F 5/101 700/117 |
| 2014/0116735 A1 | 5/2014 | Bassett | |

FOREIGN PATENT DOCUMENTS

| | | |
|---|---|---|
| DE | 102004011302 A1 | 9/2005 |
| EP | 0776598 A1 | 6/1997 |
| JP | 02069104 A | 3/1990 |
| JP | 04360604 A | 12/1992 |
| JP | H0614628 A | 1/1994 |
| JP | 08168301 A | 7/1996 |
| JP | 2001299010 A | 10/2001 |
| WO | 2008008345 A2 | 1/2008 |
| WO | 2012149398 A1 | 11/2012 |

OTHER PUBLICATIONS

Australia Office Action, Application No. 2017248423, dated Nov. 19, 2018, 6 pages.
European Patent Office Extended European Search Report, Application No. 13848234.4, dated Jul. 4, 2016, 6 pages.
European Patent Office Extended European Search Report, Application No. 13848234.4, dated Jul. 21, 2016, 7 pages.
International Search Report, PCT Application No. PCT/US2013/066639, dated Mar. 21, 2014, 10 pages.
Ukraine Office Action, Application No. a201504987, dated Jan. 31, 2018, 13 pages.

* cited by examiner

US 10,455,756 B2

AGRICULTURAL TRENCH DEPTH SENSING SYSTEMS, METHODS, AND APPARATUS

BACKGROUND

In recent years, farmers have recognized the need to select and maintain the proper planting depth to ensure the proper seed environment (e.g., temperature and moisture) and seedling emergence. To improve agronomic practices, it would also be desirable for the farmer to understand the relationship between actual planting depth and metrics such as emergence and yield. Conventional agricultural planters include only apparatus for adjusting a maximum planting depth, which may not be maintained during operation due to soil conditions or insufficient downpressure on the planter row unit. Even in operation of modern planters having sensors for determining whether full trench depth has been lost, the actual depth planted is still not determined. Thus there is a need for systems, methods and apparatus for measuring the depth of a trench opened by an agricultural planter.

DESCRIPTION

Figure 1:
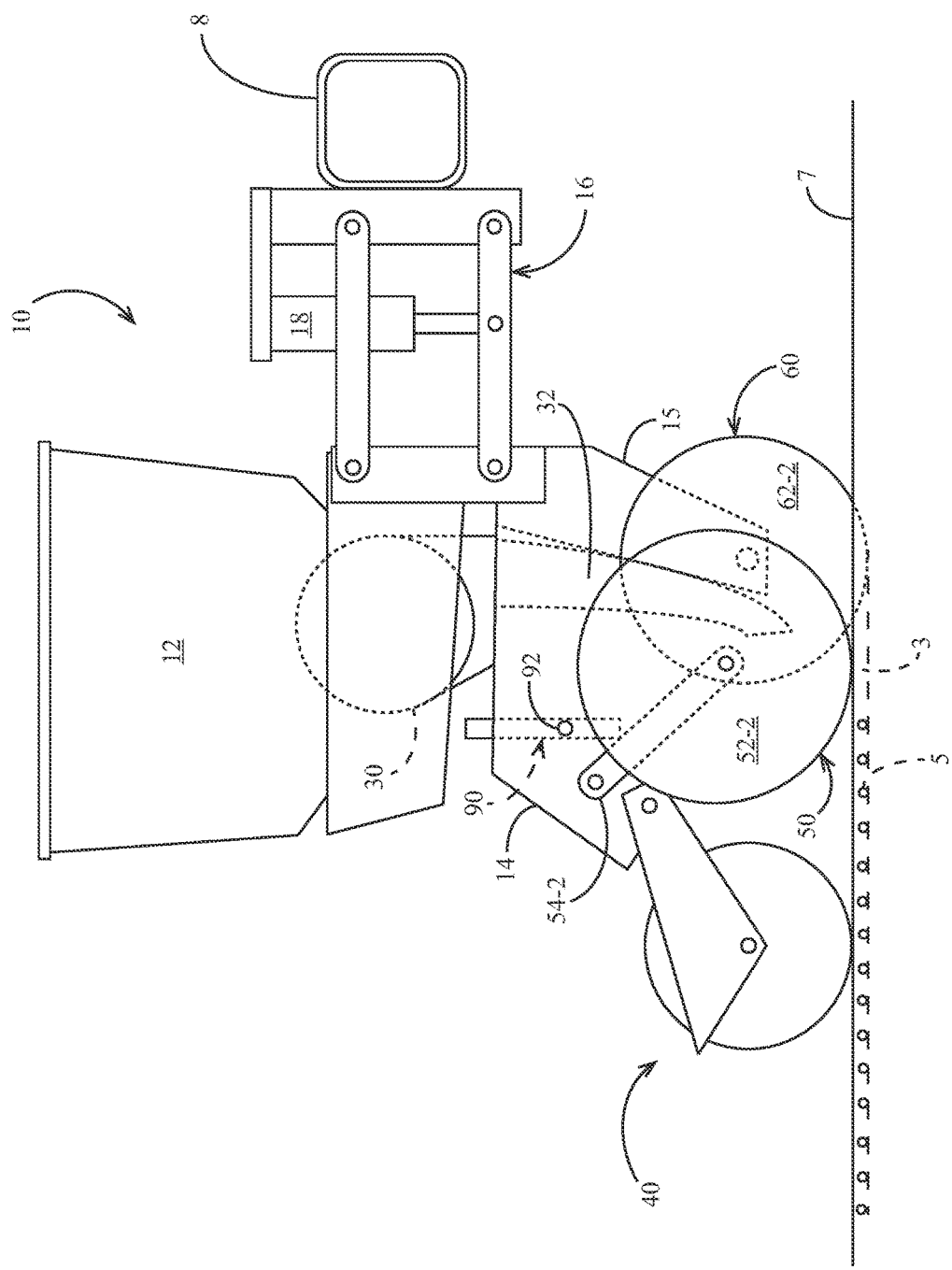
FIG. 1 is a right side elevation view of an embodiment of an agricultural row unit.
Figure 2:
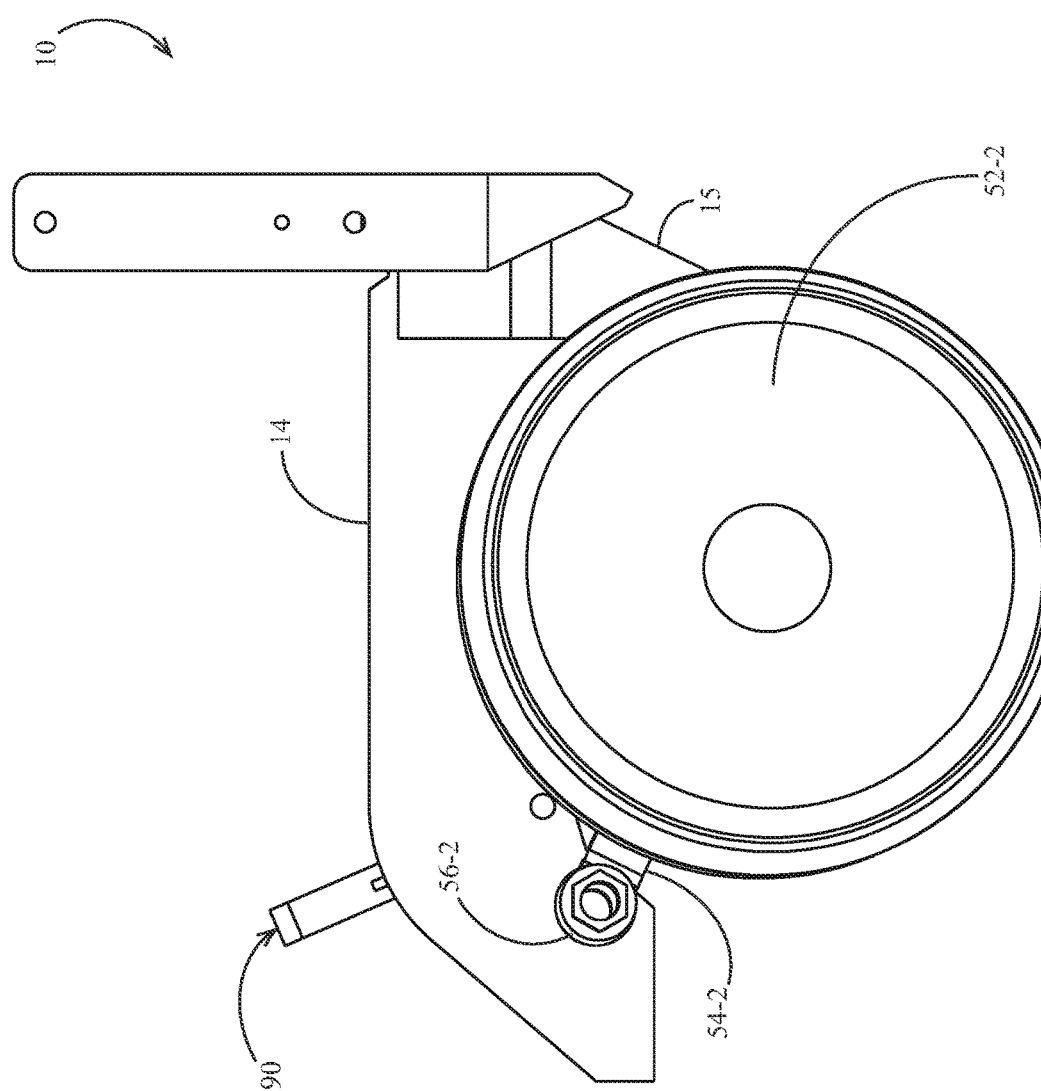
FIG. 2 is a right side elevation view of another embodiment of an agricultural row unit with certain components removed for clarity.
Figure 3:
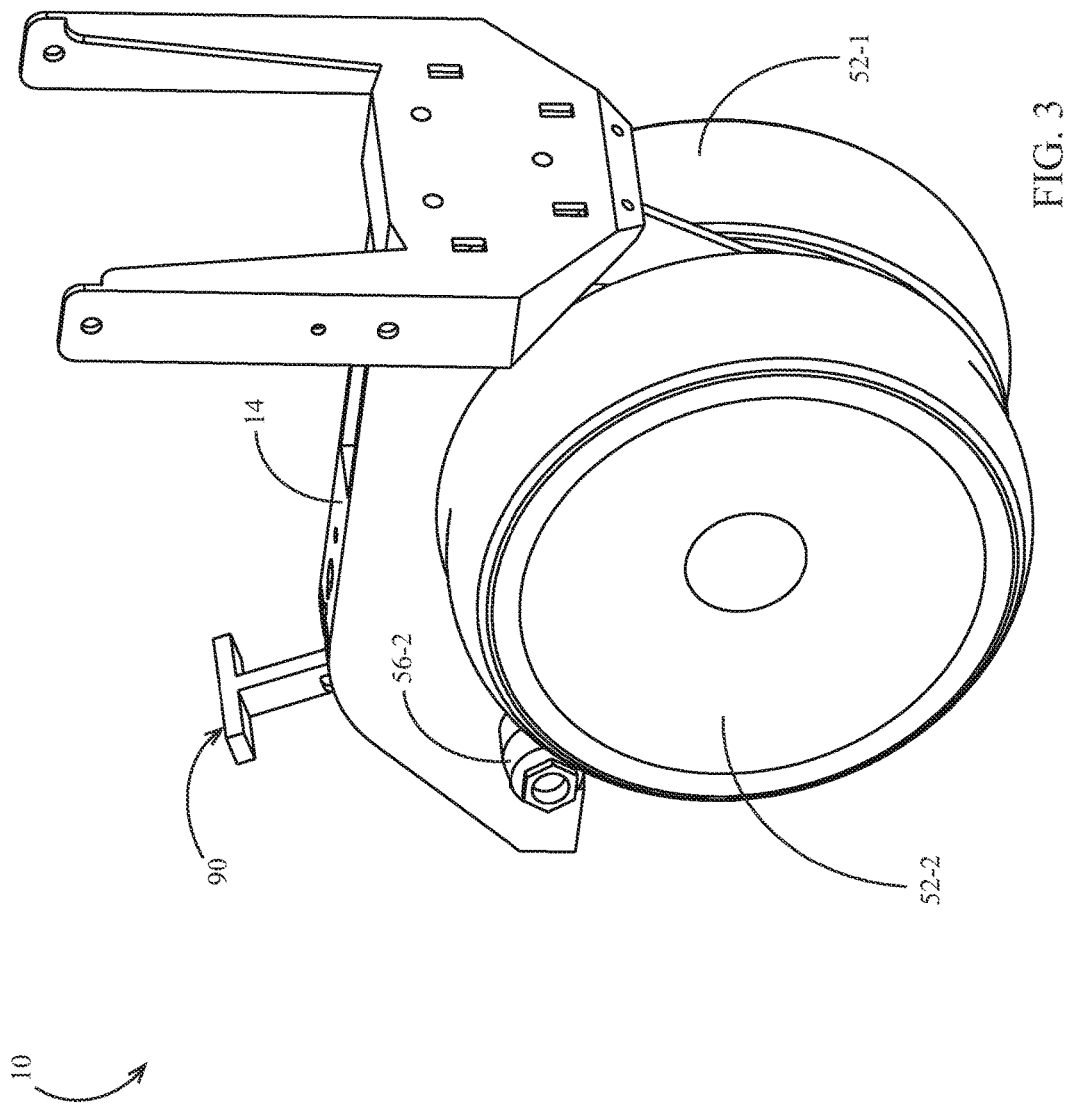
FIG. 3 is a perspective view of the agricultural row unit of FIG. 2.
Figure 4:
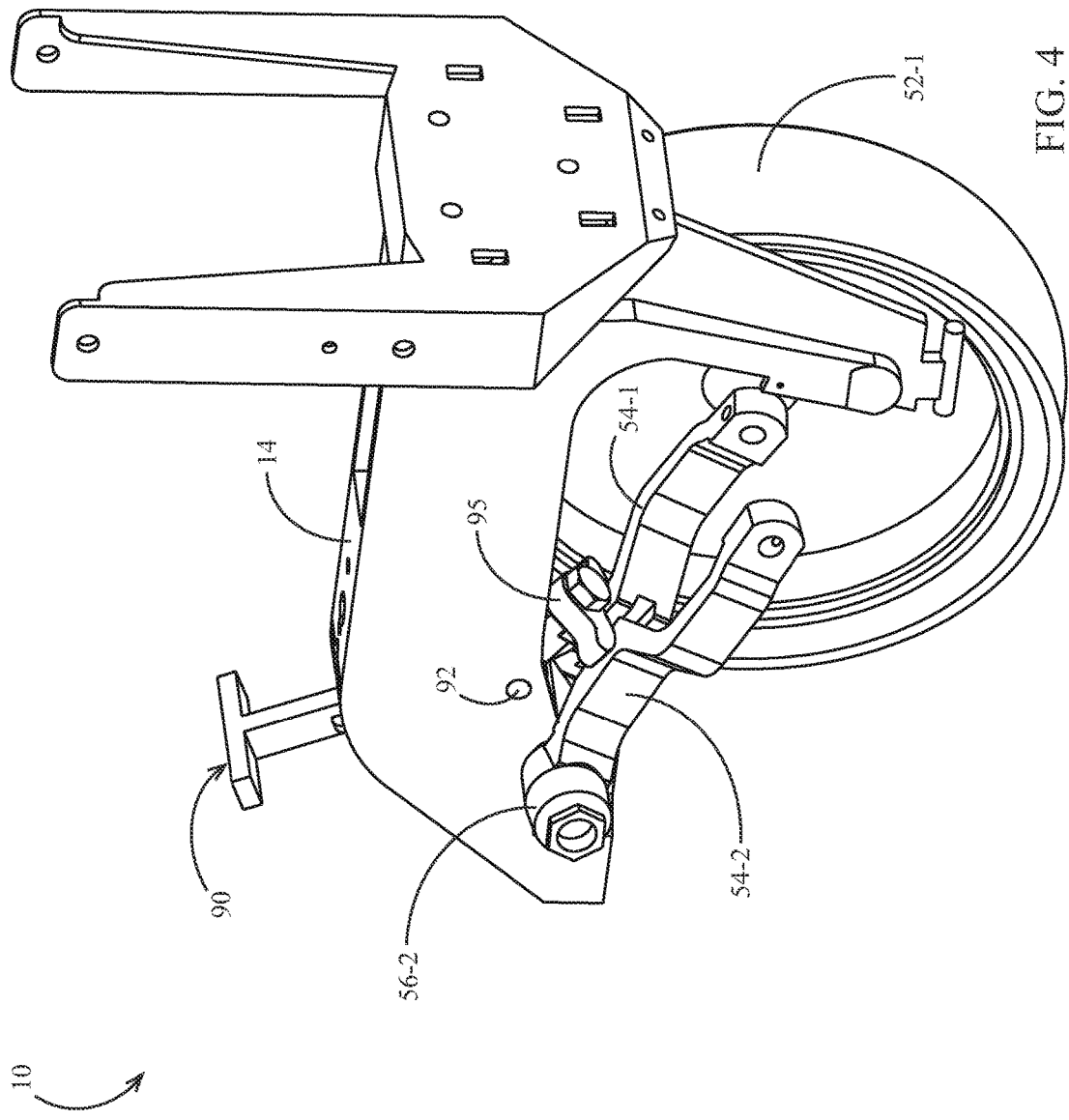
FIG. 4 is a perspective view of the agricultural row unit of FIG. 2 with a right gauge wheel removed for clarity.

Referring to the drawings, wherein like reference numerals designate identical or corresponding parts throughout the several views, FIG. 1 illustrates an agricultural implement, e.g., a planter, comprising a toolbar 8 to which multiple row units 10 are mounted in transversely spaced relation. Each row unit 10 is preferably mounted to the toolbar by a parallel arm arrangement 16 such that the row unit is permitted to translate vertically with respect to the toolbar. An actuator 18 is preferably pivotally mounted to the toolbar 8 and the parallel arm arrangement 16 and configured to apply supplemental downpressure to the row unit 10.

The row unit 10 preferably includes a frame 14. The row unit 10 preferably includes an opening disc assembly 60 including two angled opening discs 62 rollingly mounted to a downwardly extending shank 15 of the frame 14 and disposed to open a v-shaped trench 3 in a soil surface 7 as the row unit traverses a field. The row unit 10 preferably includes a gauge wheel assembly 50 including two gauge wheels 52 pivotally mounted to either side of the frame 14 by two gauge wheel arms 54 and disposed to roll along the surface of the soil. A depth adjustment assembly 90 pivotally mounted to the frame 14 at a pivot 92 preferably contacts the gauge wheel arms 54 to limit the upward travel of the gauge wheel arms 54, thus limiting the depth of the trench opened by the opening disc assembly 60. A closing assembly 40 is preferably pivotally coupled to the frame 14 and configured to move soil back into the trench 3.

Continuing to refer to FIG. 1, seeds 5 are communicated from a hopper 12 to a seed meter 30 preferably configured to singulate the supplied seeds. The meter 30 is preferably a vacuum-type meter such as that disclosed in Applicant's co-pending international patent application no. PCT/US2012/030192 (Pub. No. WO/2012/129442), the disclosure of which is hereby incorporated by reference herein in its entirety. In operation, the seed meter 30 preferably deposits the supplied seeds into a seed tube 32. The seed tube 32 is preferably removably mounted to the frame 14. In operation, seeds 5 deposited by the meter 30 fall through the seed tube 32 into the trench 3.

Turning to FIGS. 2-5, the depth adjustment assembly 90 is illustrated in more detail. The depth adjustment assembly 90 includes a rocker 95 pivotally mounted to a depth adjustment body 94. The depth adjustment body 94 is pivotally mounted to the row unit frame 14 about the pivot 92. A handle 98 is preferably slidably received within the depth adjustment body 94 such that the user can selectively engage and disengage the handle with one of a plurality of depth adjustment slots 97 (FIG. 6) formed within the row unit frame 14. In operation, the upward travel of the gauge wheels 52 is limited by contact of the gauge wheel arms 54 with the rocker 95. When one of the gauge wheels, e.g., left gauge wheel 52-1, encounters an obstruction, the rocker 95 allows the left gauge wheel arm 54-1 to travel upward while lowering the right gauge wheel 52-2 by the same absolute displacement such that the row unit 10 rises by half the height of the obstruction.

Depth Sensing Apparatus

Figure 5:
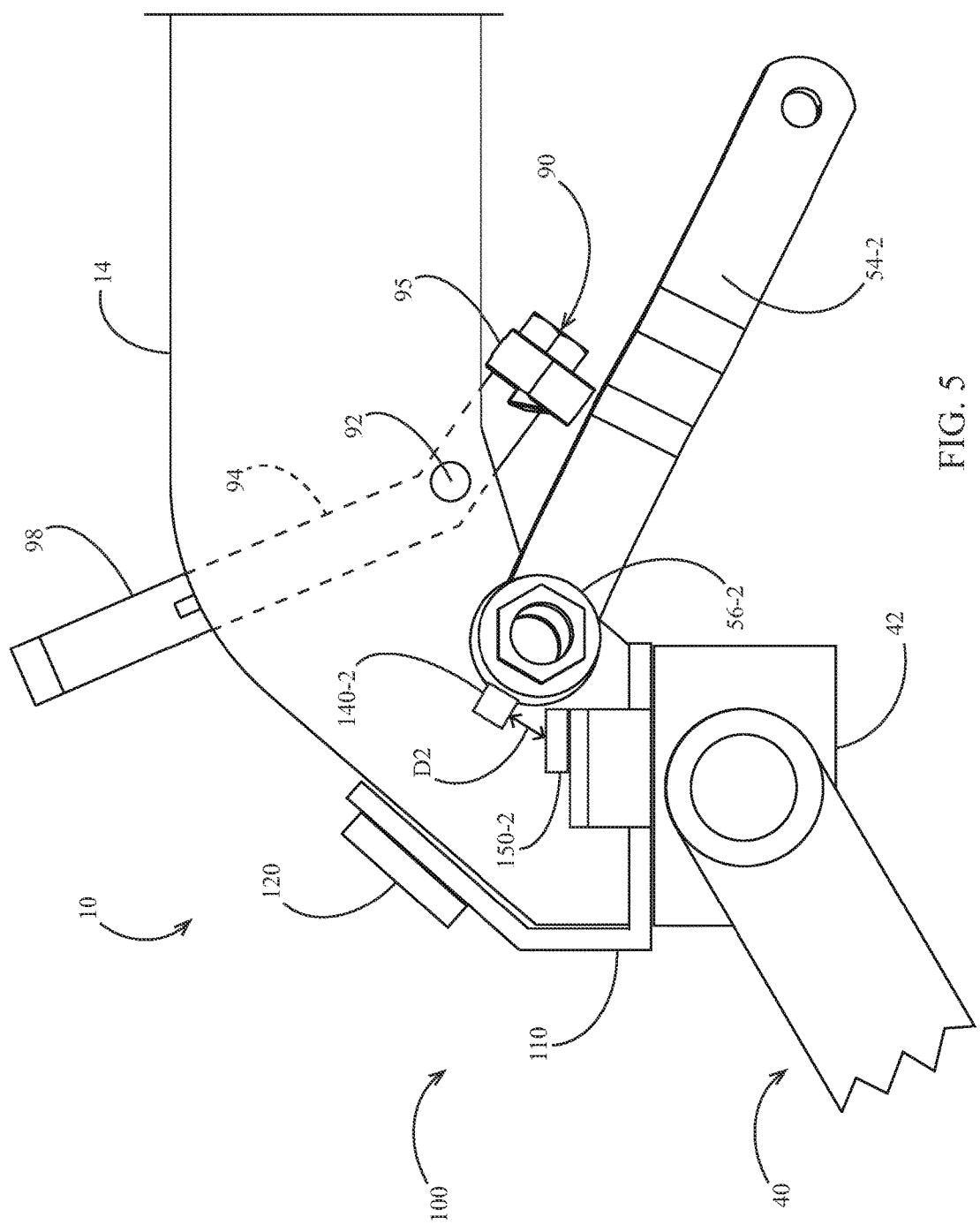
FIG. 5 is an enlarged partial right side elevation view of the agricultural row unit of FIG. 2 having an embodiment of a depth sensor assembly installed.
Figure 6:
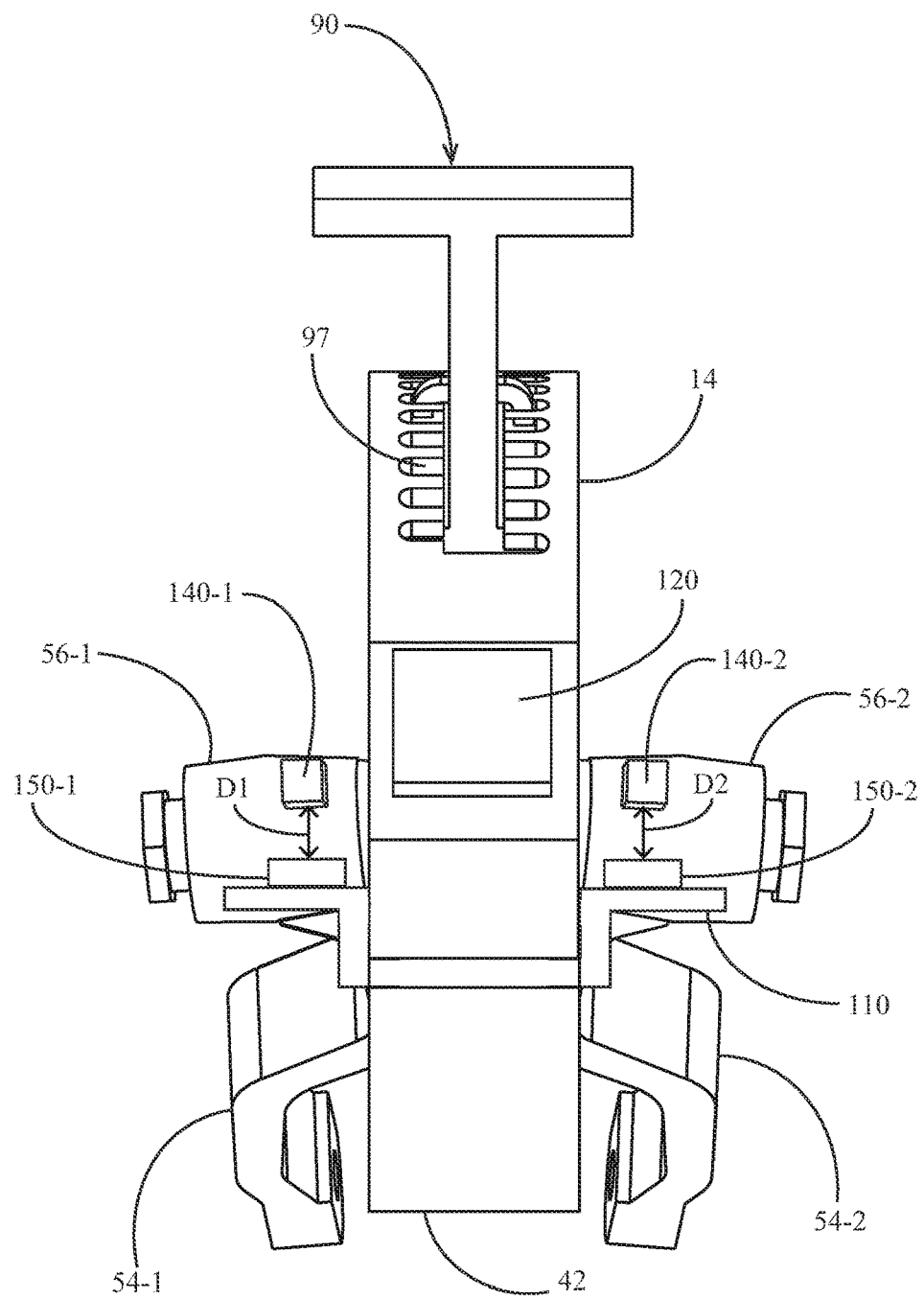
FIG. 6 is a rear elevation view of the embodiment of FIG. 5.

Referring to FIGS. 5 and 6, a depth sensor assembly 100 is shown installed on the row unit 10. The depth sensor assembly 100 includes a mounting bracket 110, preferably mounted between the row unit frame 14 and a closing wheel mounting block 42 to which the closing assembly 40 is pivotally mounted. A magnet 140 is preferably mounted to a pivot portion 56 of each gauge wheel arm 54 such that the magnet 140 travels along a circular path as the associated gauge wheel arm is rotated. A depth sensor 150, preferably comprising a Hall-effect sensor, is preferably supported by the bracket 110 in a position adjacent to each magnet 140 on either side of the row unit frame 14. The bracket 110 preferably supports the depth sensor 150 in a position that maximizes proximity to the magnet 140 without interfering with the magnet 140 when the gauge wheel 52 is raised to an extreme position. The bracket 110 preferably additionally supports a signal processor 120. In operation, both depth sensors 150-1,150-2 preferably generate a signal inversely related to the distance D1, D2 between the depth sensors 150-1,150-2 and the associated magnets 140-1,140-2, respectively. For example, as the right gauge wheel arm 54-2 lowers (i.e., rotates clockwise on the view of FIG. 5), the magnet 140-2 rotates clockwise such that the distance D2 increases and the signal generated by the depth sensor 150-2 decreases.

It should be appreciated that the depth sensor 150 comprises a position sensor configured to generate a signal related to the position of an object, in this case the magnet 140 and thus the gauge wheel arm to which the magnet is mounted. In alternative embodiments, a depth sensor 150 is mounted to the pivot portion 56 of each gauge wheel arm 54 and a magnet 140 is mounted to the bracket 110.

Figure 7:
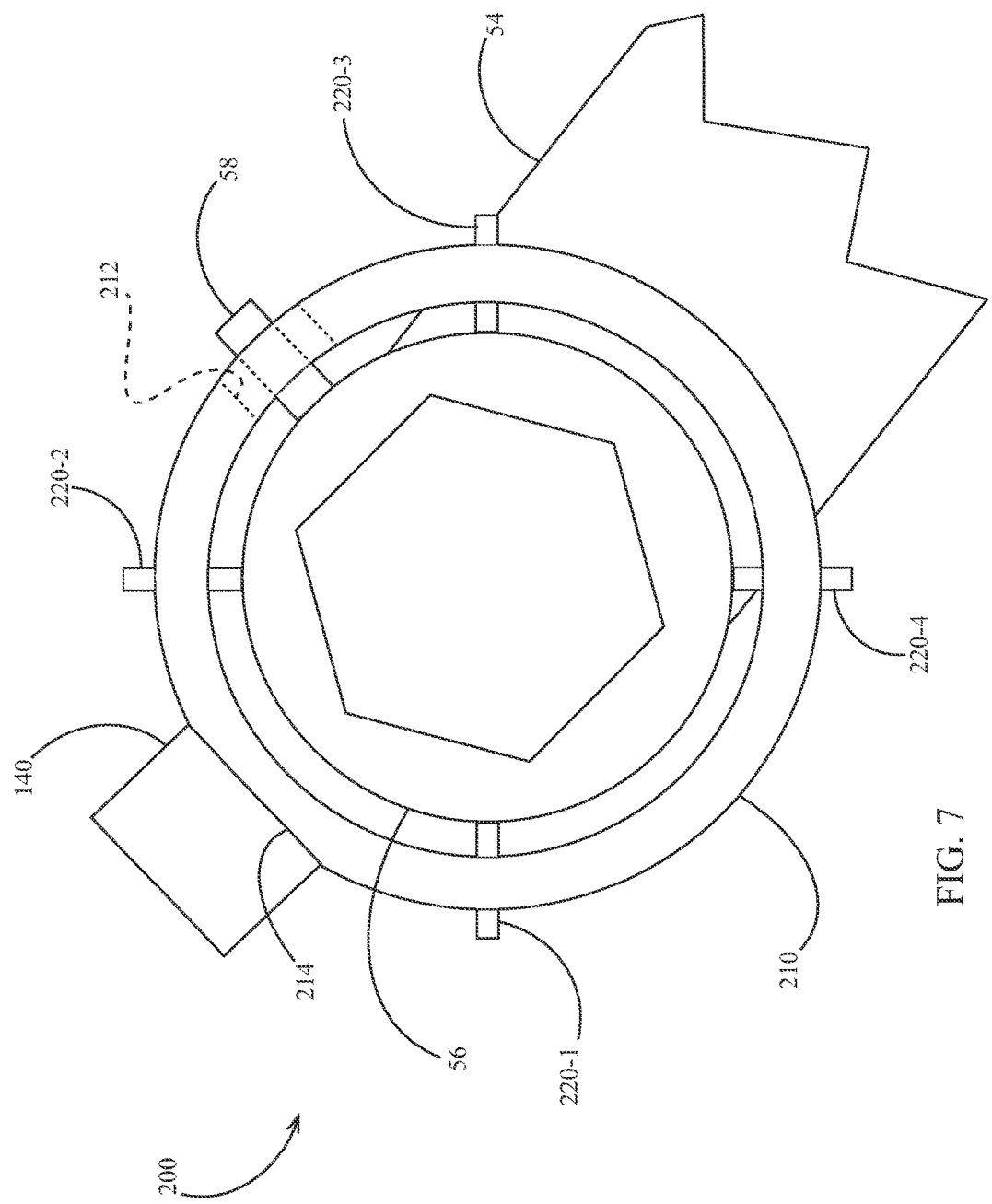
FIG. 7 is an enlarged partial right side elevation view of a gauge wheel arm with an embodiment of a magnet installation bracket installed.

It should be appreciated that the pivot portion 56 of a conventional gauge wheel arm is not conducive to mounting the magnet 140 in a precise location such that the signals generated by the depth sensor 150 are predictable. Referring to FIG. 7, a mounting assembly 200 is illustrated including a circumferential mounting rim 210. The mounting rim 210 preferably includes a flat mounting surface 214 to which the magnet 140 is mounted. The mounting rim 210 is preferably sized to surround a portion of the pivot portion 56 of the gauge wheel arm 54. The mounting rim 210 is preferably configured to receive a group of set screws 220 at radially spaced locations. In installation of the mounting rim 210, the set screws 220 are threaded into the mounting rim 210 to mount the mounting rim to the pivot portion 56. In some embodiments, a cylindrical guide (not shown) is inserted in a gap between the mounting rim 210 and the pivot portion 56 while the set screws 220 are inserted in order to ensure that the mounting rim is concentrically and symmetrically positioned with respect to the pivot portion. In order to ensure consistent angular positioning of the mounting rim 210 relative to the pivot portion 56, in some embodiments the mounting rim 210 includes an opening 212 sized to receive a grease zerk 58 in the gauge wheel arm 54. A grease gun (not shown) is used to insert grease through the grease zerk 58 into the joint between the gauge wheel arm 54 and the row unit frame 14. The opening 212 is preferably sized such that the grease gun can be tightly fit inside the opening 212 between around the grease zerk 58, fixing the angular orientation of the mounting rim 210 relative to the pivot portion 56. The position of the opening 212 relative to the mounting surface 214 is preferably selected so that the mounting surface (as well as the magnet mounted to the mounting surface) is in a defined position with respect to the gauge wheel arm. With the magnet in the defined position, when the gauge wheel arm is at a full depth position, the magnet 140 is preferably within a reliably detectable distance of the depth sensor 150.

Figure 8:
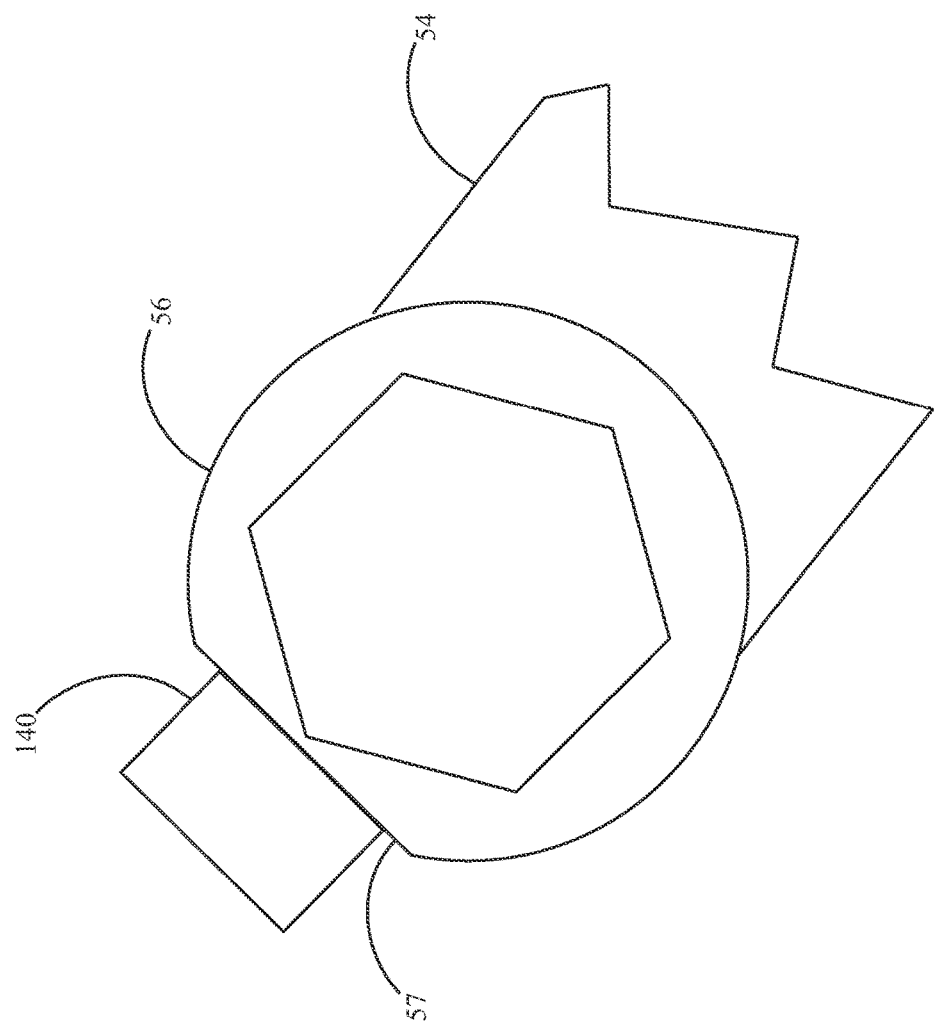
FIG. 8 is an enlarged partial right side elevation view of another embodiment of a gauge wheel arm having a magnet mounting surface.

Turning to FIG. 8, in other embodiments a modified gauge wheel arm 54' includes a flat mounting surface 57 in the pivot portion 56. The magnet 140 is preferably mounted directly to the mounting surface 57.

Figure 12:
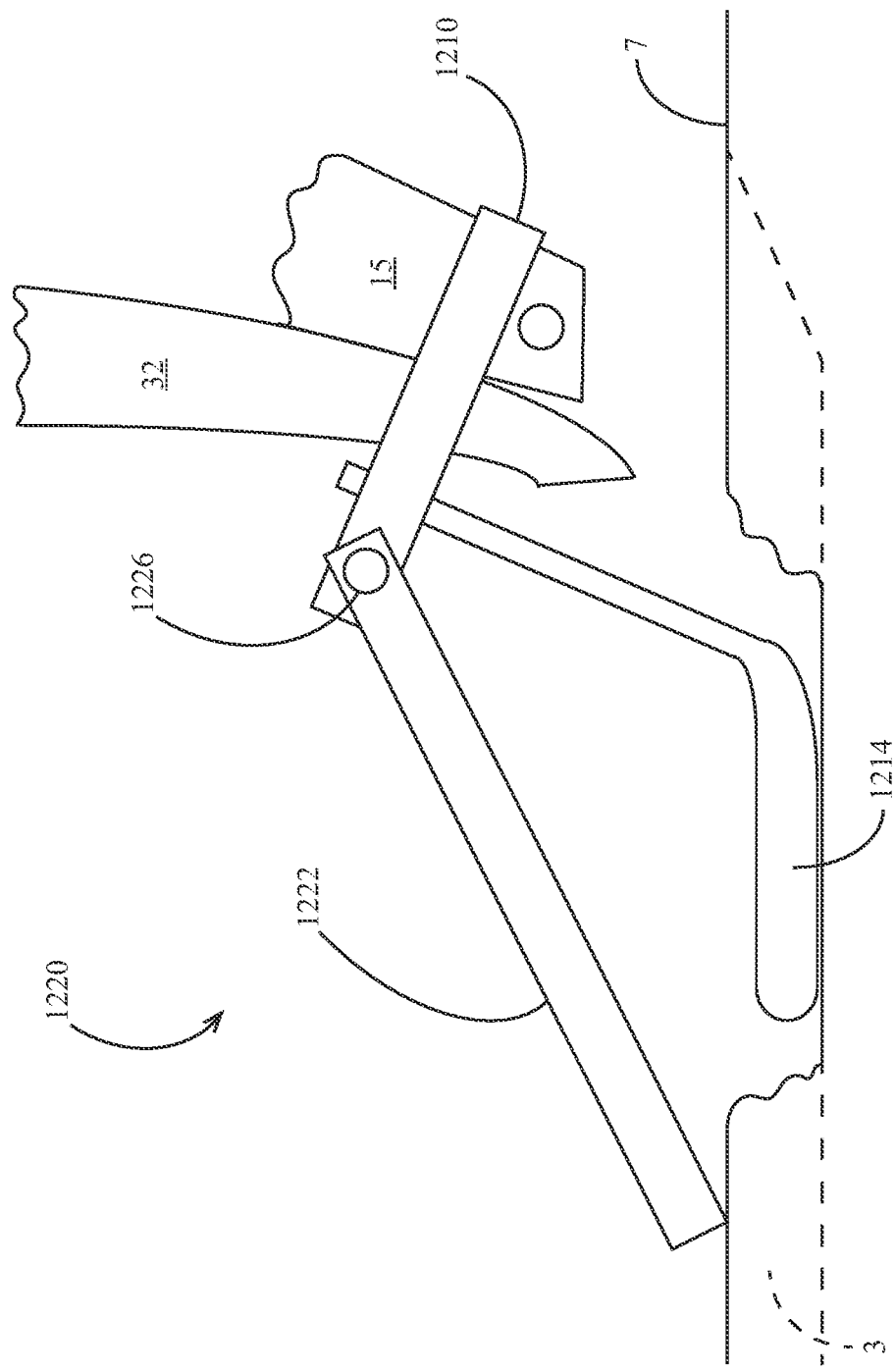
FIG. 12 is a side elevation view of another embodiment of a depth sensor.
Figure 13:
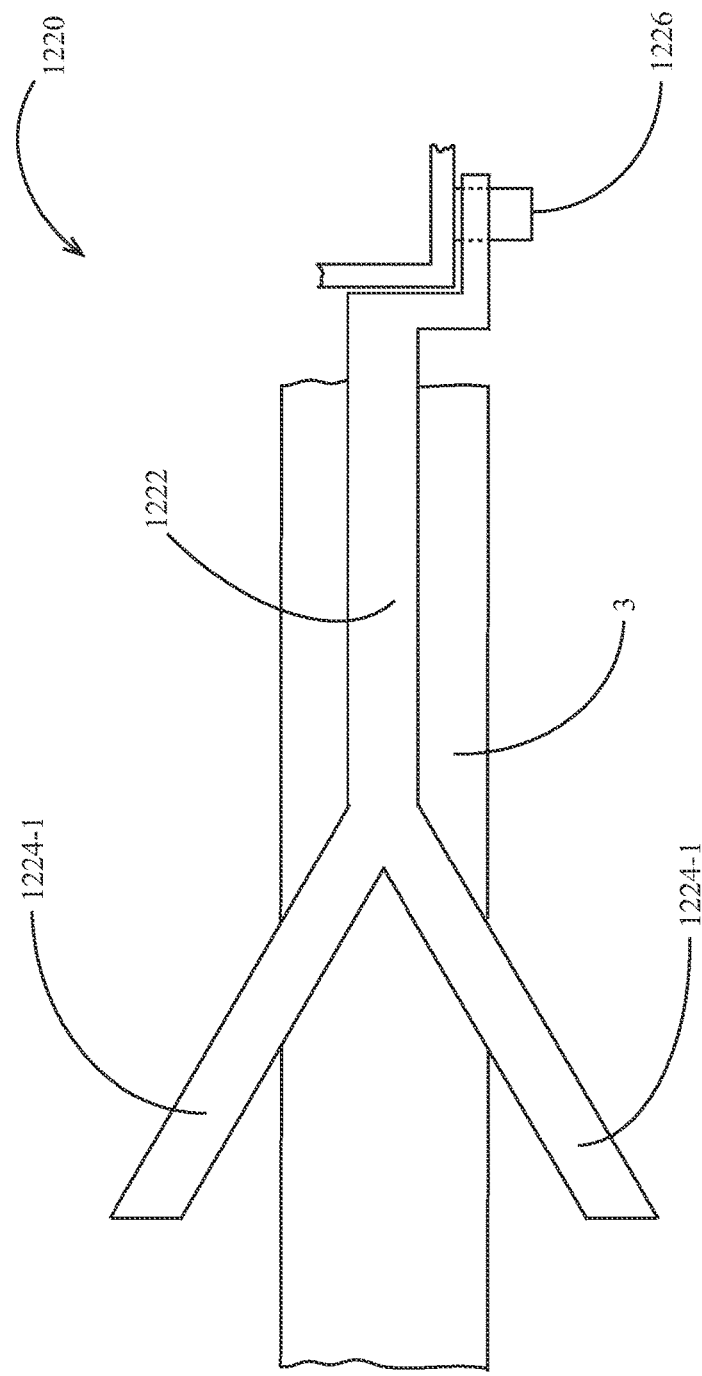
FIG. 13 is a top view of the depth sensor of FIG. 12.

Turning to FIGS. 12 and 13, in other embodiments a depth sensor 1220 is used to measure the vertical position of the row unit relative to the soil surface 7. The depth sensor 1220 preferably includes a pivot arm 1222 pivotally mounted to a bracket 1210. The bracket 1210 is preferably mounted to a lower portion of the shank 15. In some embodiments a resilient seed firmer 1214 is also mounted to the bracket 1210. In such embodiments, the bracket 1210 preferably extends around the seed tube 32 as best illustrated in FIG. 12. The pivot arm preferably includes left and right ground-engaging fingers 1224-1, 1224-2, respectively. The ground-engaging portions of the fingers 1224 are preferably spaced by a transverse spacing wider than the trench 3 such that the fingers 1224 contact the soil surface 7 on either side of the trench.

A sensor is preferably used to generate a signal related to the angular position of the pivot arm 1222. In the illustrated embodiment, the pivot arm 1222 is pivotally mounted to the bracket 1210 via a rotary encoder 1226 (e.g., an angular displacement sensor no. 55250 available from Hamlin Incorporated, Lake Mills, Wis.). In operation, the fingers 1224 ride along the soil surface 7 such that the angular position of the pivot arm is constrained by the vertical height of the row unit 10 relative to the soil surface. A signal generated by the encoder 1226 is thus related to the vertical height of the row unit 10 with respect to the soil, and thus to the depth of the trench 3.

Depth Sensing Systems

Figure 9:
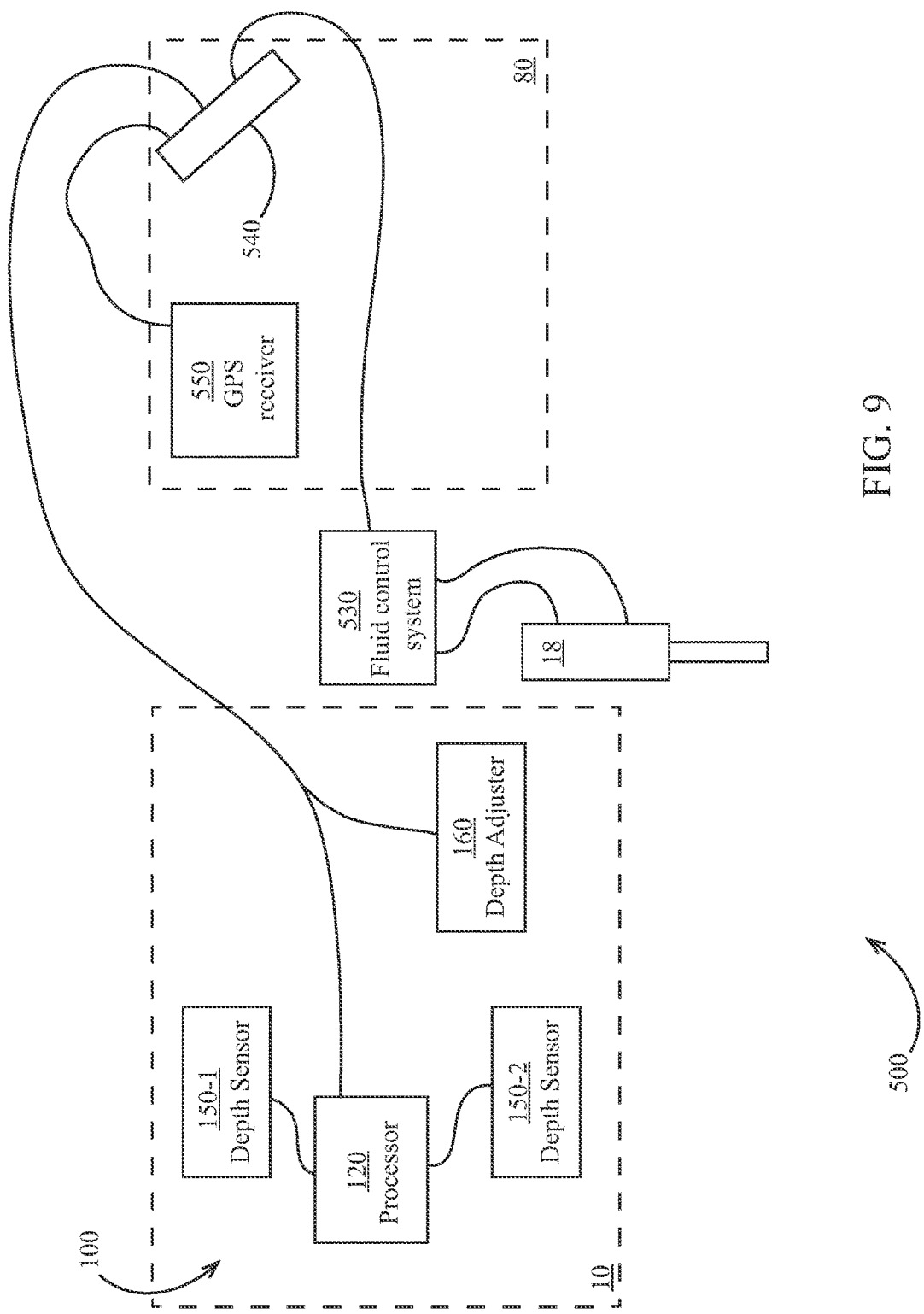
FIG. 9 schematically illustrates an embodiment of a depth sensor system installed on a tractor and planter.

A depth sensing system 500 for measuring row unit downforce and modifying downpressure is illustrated in FIG. 9. The depth sensors 150-1,150-2 mounted to each row unit 10 (or in other embodiments the depth sensor 1220) are preferably in electrical communication with the processor 120. The processor 120 is preferably in electrical communication with a monitor 540, which is preferably mounted in a cab 80 of a tractor drawing the planter. The monitor 540 is preferably in electrical communication with a fluid control system 530. The fluid control system 530 is preferably in fluid communication with the actuator 18. The fluid control system 530 is preferably configured to modify the pressure applied by the actuator 18 on the row unit 10. In some embodiments, the fluid control system 530 preferably includes electro-hydraulic solenoid valves in fluid communication with a down chamber and a lift chamber of the actuator 18. The fluid control system 530 is preferably configured to control the pressure supplied to the actuator 18 in a pressure control mode to maintain a selected pressure in the actuator, e.g., using solenoid operated pressure reducing-relieving valves. The monitor 540 preferably includes a central processing unit, a memory, and a graphical user interface configured to display the depth measured by the depth sensor assembly 100. The monitor 540 preferably includes processing circuitry configured to modify a command signal to the fluid control system 530 based on an input from the depth sensor assembly 100. The command signal preferably corresponds to a selected pressure. The monitor 540 is also preferably in electrical communication with a GPS receiver 550 mounted to the tractor or the planter.

In some embodiments of the depth sensing system, the monitor 540 is additionally in electrical communication with a depth adjuster 160. The depth adjuster 160 is preferably configured to pivot the depth adjustment assembly 90 in order to modify the depth of the trench 3. In some embodiments the depth adjuster 160 comprises a depth adjustment apparatus as disclosed in U.S. Patent Application No. 2013/0104785, the disclosure of which is hereby incorporated herein by reference. The monitor 540 is preferably configured to send a command signal to the depth adjuster 160 to instruct the depth adjuster to modify the depth of the trench 3. The monitor 540 is further preferably configured to modify the depth adjuster command signal based on a signal received from one of the depth sensing apparatus described herein.

Depth Sensor Calibration Methods

It should be appreciated that even with consistent mounting locations of the magnet 140 on the gauge wheel arm 54, two primary factors will affect the correlation between the depth sensor signal and the actual depth of the trench 3.

First, circumferential wear on the opener discs 62 requires the gauge wheels 52 to rise further (i.e., rotate further counter-clockwise on the view of FIG. 1) in order to effect the same trench depth. The same wear on the opener discs 62 will affect the magnitude of a signal (the "zero-depth signal") generated when the bottom of the gauge wheel 52 is even with the bottom of the opener disc 62; in operation, this configuration indicates that the bottom of the opener disc is even with the soil surface 7, resulting in zero trench depth. Second, the operator will regularly add or remove shims from the joint between the gauge wheel arm 54 and the row unit frame 14 in order to maintain a tight fit between an inner surface of the gauge wheel 52 and an outer surface of the corresponding opener disc 62. Referring to FIG. 6, adding or removing shims (not shown) moves the gauge wheel arm 54 to the right or left, modifying the distance D (and thus the depth sensor signal) for the same orientation of the gauge wheel 52.

Figure 10:
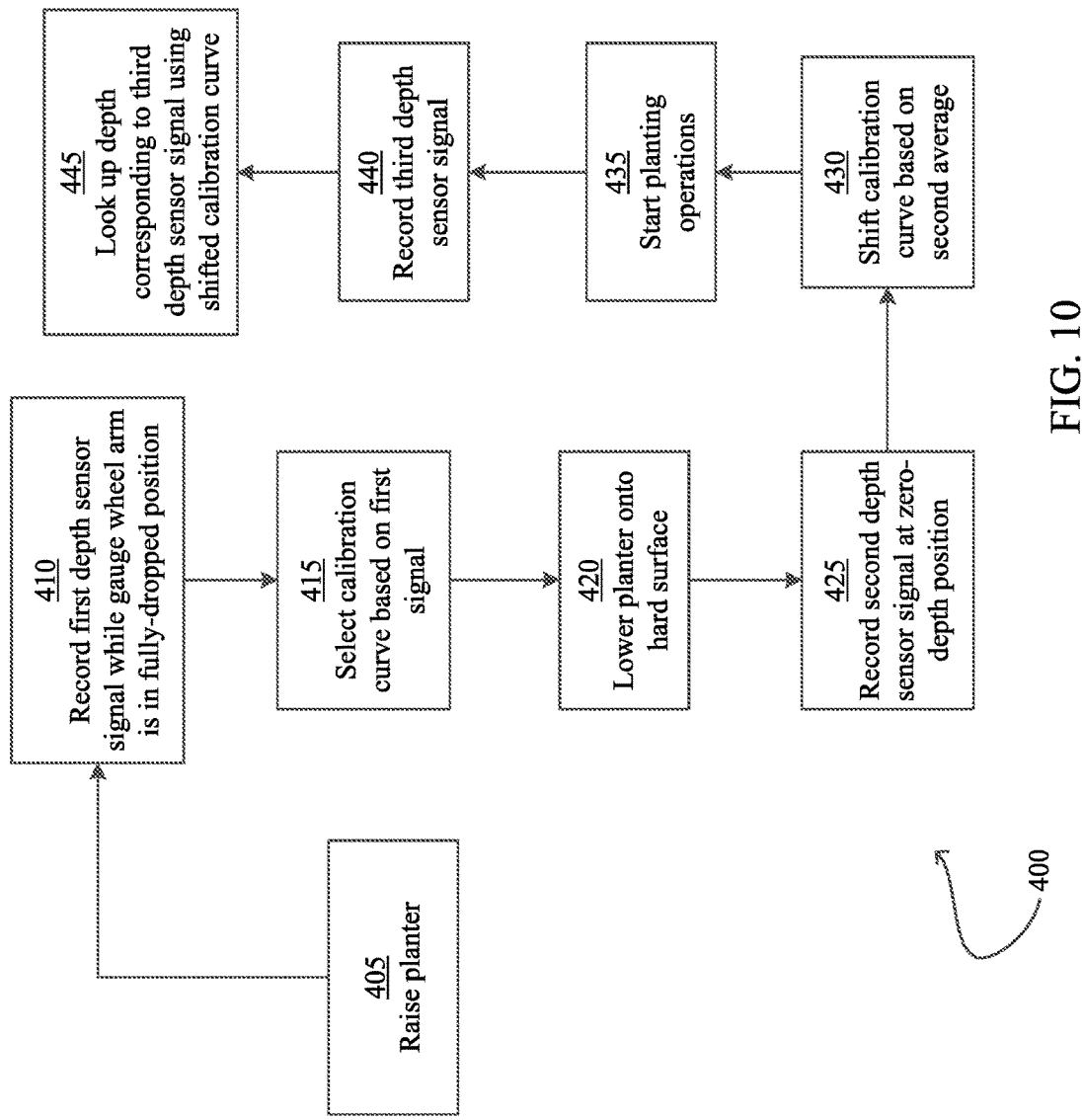
FIG. 10 illustrates an embodiment of a process for calibrating a depth sensor.

A process 400 for calibrating the depth sensor 150 is illustrated in FIG. 10. At step 405, the user preferably raises the toolbar 8 such that the gauge wheel arm 54 lowers to its lowest position against a stop (not shown) provided on the row unit frame 14. At step 410, the monitor 540 preferably records a first depth sensor signal at in this fully-dropped position, which it should be appreciated corresponds to the maximum distance between the magnet 140 and the depth sensor 150. At step 415, monitor 540 preferably selects a calibration curve based on the first depth sensor signal. Multiple calibration curves relating signal level to depth are preferably developed and stored in the memory of the monitor 540; the monitor 540 preferably selects the calibration curve having the minimum signal level closest to the first depth sensor signal recorded at step 410. At step 420, the user preferably lowers the planter onto a hard surface such that the signal generated by the 150 corresponds to the zero-depth signal. At step 425, the monitor 540 preferably records a second depth sensor signal corresponding to the zero-depth position. At step 430, the monitor 540 preferably shifts the calibration curve selected at step 415 such that the zero-depth signal corresponds to the second depth sensor signal.

Continuing to refer to the process 400, at step 435 the user preferably initiates planting operations such that the opener discs 62 penetrate the soil surface 7. At step 440 the monitor 540 records a third depth sensor signal during planting operations. At step 445, the monitor 540 looks up the depth corresponding to the third depth sensor signal using the calibration curve selected at step 415 and shifted at step 430.

Depth Mapping and Depth-Based Downpressure and Depth Control Methods

Figure 11:
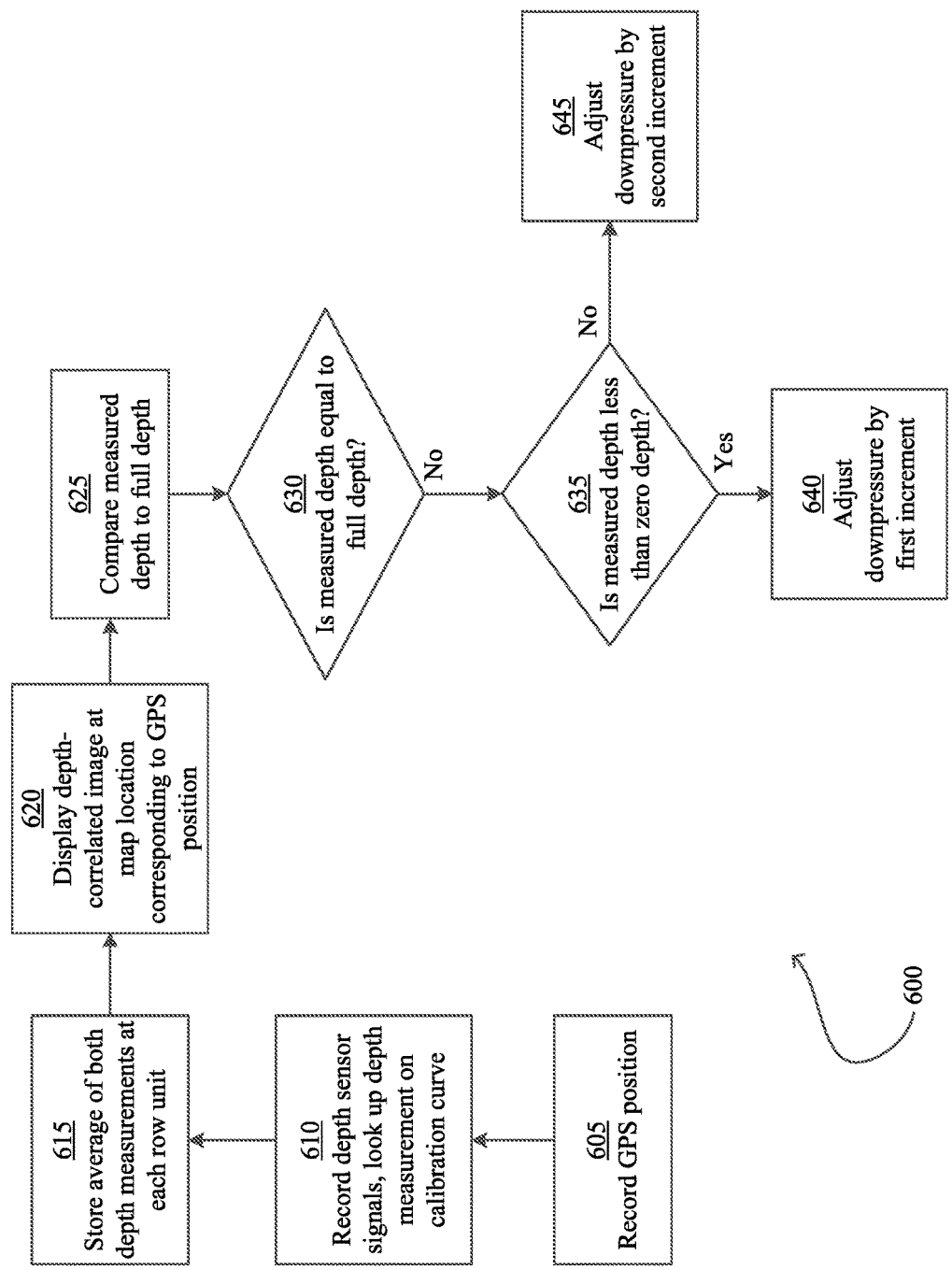
FIG. 11 illustrates an embodiment of a process for mapping row unit depth measured by a depth sensor and for modifying row unit downforce based on row unit depth.

A process 600 for mapping depth and adjusting downpressure based on measured depth is illustrated in FIG. 11. At step 605, the monitor 540 preferably records and time-stamps the GPS position of the planter reported by the GPS receiver 550. At step 610, the monitor 540 preferably receives signals from both depth sensors 150-1,150-2 associated with each row unit (or one of the other depth sensor embodiments described herein) and looks up depth measurements corresponding to both signals on a calibration curve (e.g., as in step 445 of process 400). At step 615, the monitor 540 preferably stores and time-stamps the average of both depth measurements (the "measured depth") at each row unit. At step 620, the monitor 540 preferably displays an image correlated to the measured depth on a map at a map location corresponding to the GPS position of the planter at the time of the depth measurements. For example, in some embodiments the monitor 540 displays a legend correlating colors to ranges of depth. In some such embodiments, the depth range less than zero is correlated to a single color while a set of depth ranges greater than zero are correlated to a set of colors such that the color intensity increases with depth.

Continuing to refer to the process 600, at step 625 the monitor 540 preferably compares the measured depth to the full or desired depth. At step 630 the monitor determines whether the measured depth is equal to (or within a percentage error of) full depth. If measured depth is not equal to full depth, then at step 635 the monitor 540 determines whether the measured depth is less than zero. If the measured depth is less than zero, then at step 640 the monitor 540 preferably adjusts a signal sent to the fluid control system 530 to increase downpressure applied by the actuator 18 by a first increment. If the measured depth is greater than zero, then at step 645 the monitor 540 preferably adjusts a signal sent to the fluid control system 530 to increase downpressure applied by the actuator 18 by a second increment; the second increment is preferably smaller than the first increment.

Figure 14:
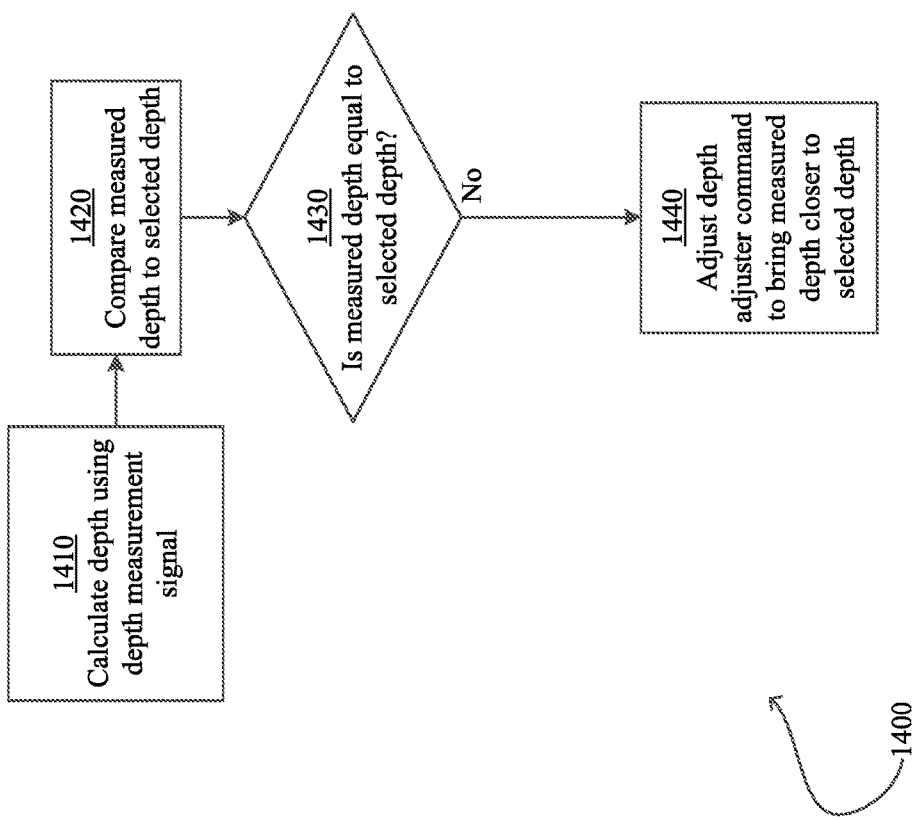
FIG. 14 illustrated an embodiment of a process for controlling trench depth.

Turning to FIG. 14, a process 1400 for controlling depth based on the signal generated by one of the depth sensors described herein. At step 1410, the monitor 540 preferably estimates the depth of the trench 3 based on the depth sensor signal. At step 1420, the monitor 540 preferably compares the measured depth to a selected depth entered by the user or previously stored in memory. The selected depth may be selected using the methods disclosed in U.S. Provisional Application No. 61/783,591, the disclosure of which is hereby incorporated by reference. If at step 1430 the measured depth is not equal to or within a threshold range (e.g. 5%) of the selected depth, then at step 1440 the monitor 540 preferably sends a modified command signal to the depth adjuster 160 in order to bring the measured depth closer to the selected depth; for example, if the measured depth is shallower than the selected depth, then the monitor 540 preferably commands the depth adjuster to rotate the depth adjustment assembly 90 in order to increase the trench depth.

Alternative Depth Sensor Embodiments

In another embodiment of the depth sensor assembly 100, the single magnet 140 is replaced with an array of magnets arranged radially around the pivot portion 56 of gauge wheel arm 54. Each magnet in the array preferably has the opposite polarity of its neighboring magnets. A depth sensor is preferably mounted to a sidewall of the row unit frame such that magnets having opposing poles pass by the depth sensor as the gauge wheel arm 54 rotates. The depth sensor preferably comprises a Hall-effect sensor such as model no. AS5304 available from Austria Microsystems in 8141 Schloss Premstatten, Austria.

In still another embodiment of the depth sensor assembly 100, the depth sensor 150 is replaced with a rotary sensor mounted to the end of a bolt used to secure the gauge wheel arm 54 in position relative to the row unit frame. The rotary sensor generates a signal related to the position of the gauge wheel arm 54 relative to the bolt.

In yet another embodiment of the depth sensor assembly 100, the depth sensor 150 is replaced with a rotary sensor mounted to the row unit frame 14. A two-bar linkage preferably connects the gauge wheel arm 54 to the rotary sensor such that the rotary sensor generates a signal related to the position of the gauge wheel arm 54 relative to the row unit frame 14.

In another embodiment, a seed firmer similar to the seed firmer embodiments disclosed in U.S. Pat. No. 5,425,318 is provided with a depth sensor assembly configured to measure the distance between a soil-engaging portion of the seed firmer and the soil surface 7. In some embodiments, a linkage is provided between the soil-engaging portion of the seed firmer and a ski or skis configured to ride along the soil surface 7 adjacent to the trench; a Hall-effect or other position sensor is disposed to detect a position of the linkage such that the sensor signal is related to the depth at which the seed firmer engages the bottom of the trench relative to the soil surface. In other embodiments, a similar sensor is used with a linkage connecting the soil-engaging portion of the seed firmer to the gauge wheel arm 54. In some embodiments, the depth sensor comprises one of the embodiments disclosed in the '591 application previously incorporated by reference.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method of measuring actual depth of a trench opened in a soil surface of a field by an opening disc of agricultural row unit, the agricultural row unit including a gauge wheel, the gauge wheel supported by a gauge wheel arm pivotally mounted to a frame of the agricultural row unit, a depth adjustment assembly having a plurality of selectable positions, each of the selectable positions establishing a selected trench depth by limiting an amount of upward travel of the gauge wheel relative to the opening disc, the method of measuring the actual trench depth comprising:
   as the agricultural row unit traverses the field with the depth adjustment assembly in one of the selectable trench depth positions, generating a trench depth signal related to an actual trench depth opened in the soil surface by the opening disc;
   determining a measured trench depth value based on said trench depth signal;
   determining a location of the agricultural row unit in the field based on a GPS signal;
   associating said measured trench depth value with said location; and
   generating a trench depth map spatially relating a plurality of locations in the field with the measured trench depth at each of said plurality of locations.

2. The method of claim 1, further comprising:
   comparing said measured trench depth to the selected trench depth; and
   modifying a position of a depth actuator to bring said measured trench depth closer to the selected trench depth.

3. The method of claim 1, further comprising:
   comparing said measured trench depth to the selected trench depth; and
   modifying a configuration of a downpressure valve to bring said measured trench depth closer to the selected trench depth.

4. The method of claim 1, further comprising:
   comparing said measured trench depth to a full depth; and
   if said measured trench depth is not equal to a full depth, adjusting the pressure of a downpressure actuator, said downpressure actuator disposed to modify a downpressure applied to the agricultural row unit.

5. The method of claim 4, further comprising:
   determining whether said measured depth is less than a zero depth;
   if said measured depth is less than the zero depth, adjusting downpressure by a first increment; and
   if said measured depth is not less than the zero depth, adjusting downpressure by a second increment, wherein said first increment is different in value from said second increment.

6. The method of claim 1, further comprising:
   displaying on a display viewable to a user, said trench depth map.

7. The method of claim 6, wherein said step of determining a measured trench depth value comprises looking up said first depth signal in a calibration dataset.

8. The method of claim 7, wherein said calibration dataset is updated by a calibration process, said calibration process comprising:
   recording a first calibration signal while the first gauge wheel arm is in a first known position; and
   modifying said calibration dataset based on said first calibration signal.

9. The method of claim 8, wherein said calibration process further comprises:
   recording a second calibration signal while said first gauge wheel arm is in a second known position; and
   selecting a subset of said calibration dataset based on said second calibration signal.

10. The method of claim 8, wherein said first gauge wheel arm is placed in said first known position by lowering the agricultural row unit onto a surface, wherein said surface is not penetrated by the opening disc of the agricultural row unit.

* * * * *